United States Patent
Rantalainen et al.

(10) Patent No.: US 6,667,963 B1
(45) Date of Patent: Dec. 23, 2003

(54) CELLULAR RADIO SYNCHRONIZATION

(75) Inventors: Timo Rantalainen, Helsinki (FI); Ville Ruutu, Espoo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/231,067

(22) Filed: Jan. 14, 1999

(30) Foreign Application Priority Data

Jan. 21, 1998 (FI) ................................................... 980134

(51) Int. Cl.⁷ ................................................. H04J 3/00
(52) U.S. Cl. ...................... 370/337; 370/347; 370/350; 370/503; 455/404.2; 455/456.1
(58) Field of Search ................................ 370/324, 331, 370/332, 337, 347, 321, 350, 442, 458, 498, 503, 508, 509; 455/456.1, 404.2, 438, 439, 502; 375/356; 340/539.11, 539.13, 573

(56) References Cited

U.S. PATENT DOCUMENTS

| | | | |
|---|---|---|---|
| 5,355,515 A | * 10/1994 | Sicher | 455/456 |
| 5,600,706 A | 2/1997 | Dunn et al. | 379/59 |
| 5,640,679 A | * 6/1997 | Lundqvist et al. | 370/337 |
| 5,799,255 A | 8/1998 | Berg et al. | 455/551 |
| 6,108,553 A | * 8/2000 | Silventoinen et al. | 455/456 |
| 6,167,275 A | * 12/2000 | Oros et al. | 455/456 |

FOREIGN PATENT DOCUMENTS

| | | |
|---|---|---|
| EP | 0 767 594 A2 | 4/1997 |
| EP | 0 848 508 A2 | 6/1998 |
| FI | 902080 | 10/1990 |

OTHER PUBLICATIONS

Rantalinen et al, Mobile Station Emergency Locating in GSM, IEEE, pp. 232–238, 1996.*
"The Pseudo–Synchronisation, A Costless Feature To Obtain The Gains Of A Synchronised Cellular Network", Mouly et al., MRC Mobile Radio Conference, pp. 51–55.

* cited by examiner

Primary Examiner—Dang Ton
Assistant Examiner—Frank Duong
(74) Attorney, Agent, or Firm—Perman & Green, LLP

(57) ABSTRACT

A cellular radio network based positioning system for determining the position of a mobile station (16). For each base transceiver station (1 to 5) or cell of the network, a fixed list of base transceiver stations is stored by a Mobile Positioning Centre (13). Each list identifies those base transceiver stations which enable the position of a mobile station served by the corresponding base transceiver station (6) to be optimally determined. The list is transmitted to the mobile station (16) via the serving base transceiver station (6) together with a list of respective real time differences which exist between the serving base transceiver stations and the listed base transceiver stations. The mobile station determines an observed time difference for each of the listed base transceiver stations, relative to the serving base transceiver station (6), from signals broadcast by the listed base transceiver stations. The mobile station listens for synchronization sequences contained in these signals during time windows defined by the various real time differences. The observed time differences are transmitted from the mobile station (6) to the serving base transceiver station (6) and are used by the network to compute the position of the mobile station (16).

6 Claims, 2 Drawing Sheets

CELLULAR RADIO SYNCHRONIZATION

FIELD OF THE INVENTION

The present invention relates to a method and apparatus for synchronising a mobile communications device to a first radio channel transmitted from a first radio transmitter when the mobile communication device is currently synchronised to a second radio channel transmitted from a second radio transmitter.

BACKGROUND OF THE INVENTION

In a cellular radio telephone network, it is desirable in many circumstances to be able to at least approximately identify the position of a mobile station (MS), e.g. to within a few hundred metres. For example, this may be useful in order to despatch an emergency vehicle when an emergency call is made from the MS.

EP0767594 describes a system capable of achieving accurate position determination and which measures the time of arrival, at a MS, of synchronisation sequences transmitted at regular intervals by a set of respective neighbouring Base Transceiver Stations (BTSs) of the cellular network. The measured times of arrival (termed Observed Time Differences OTDs) are relative to the MS's internal clock which is synchronised with synchronisation sequences transmitted by a serving BTS, user and signalling data being transmitted between the MS and the cellular network via the serving BTS. Assuming that the neighbouring BTSs and the serving BTS are transmitting their synchronisation sequences at exactly the same time, then the OTDs measured for the neighbouring BTSs represent the difference in propagation times between the respective neighbouring BTSs and the serving BTS. In practice, the neighbouring BTSs are not synchronised with the serving BTS (i.e. there exists a timing offset or a Real Time Difference RTD) and it is necessary to compensate the measured OTDs using the RTDs to obtain the actual or Geometric Time Difference (i.e. GTD=OTD−RTD). The principle of operation of the system of EP0767594 is illustrated in FIG. 1 where the GTD obtained for each neighbouring BTS can be used to define a hyperbola, the point of intersection of the hyperbolas being the location of the MS.

EP0767594 requires that the radio receiver of the MS be tuned in turn to each of the broadcast frequencies of the neighbouring BTSs for which an OTD is to be obtained. Once tuned, the received signal is analysed, e.g. using a matched filter, until the required synchronisation is observed. A problem with this approach is that if a synchronisation sequence is missed, e.g. due to noise, then the receiver must continue listening until the next synchronisation sequence is received. Acquisition of a synchronisation sequence may therefore take a relatively long time during much of which the receiver is needlessly occupied. Furthermore, because the MS is analysing large amounts of data between synchronisation sequences, the possibility of the detector mistakenly identifying a synchronisation sequence is greatly increased.

These same problems arise wherever it is necessary to synchronise a MS to a new radio channel, when the MS is currently synchronised with some other radio channel. For example, when a MS moves out of the coverage area of a BTS it is necessary to "handover" the MS to a new BTS which can provide acceptable coverage to the MS. At any given time, a MS may make preliminary synchronisation measurements on several potential handover candidates so that a handover can be rapidly carried out when necessary.

SUMMARY OF THE INVENTION

It is an object of the present invention to overcome or at least mitigate the above noted disadvantages. This and other objects are achieved by notifying the MS of the expected time of arrival of a synchronisation sequence or feature transmitted from a BTS to which the MS is to be synchronised.

In a Time Division Multiple Access (TDMA) cellular radio telephone system, the present invention provides a method of synchronising a mobile communications device to a first radio channel transmitted from a first radio transmitter when the mobile communication device is currently synchronised to a second radio channel transmitted from a second radio transmitter, and wherein said first radio channel conveys at least one synchronisation feature, the method comprising:

determining the real time difference between the operating clocks of said first and second radio transmitters;

transmitting said determined real time difference, or a value or values derived therefrom, from said second transmitter to the mobile communications device, over said second radio channel; and causing the mobile communication device to listen to said first radio channel for said synchronisation feature during a time window derived from said real time difference or said value(s).

Where the time window over which the mobile communications device listens to said first radio channel is relatively narrow, embodiments of the present invention may substantially reduce the possibility of noise or other signals on other portions of the first radio channel giving rise to erroneous detection results. In addition, embodiments of the present invention may reduce the power consumption requirements of the mobile device as the receiver of the device need be active only for the duration of the time window.

Preferably, said real time difference is determined using time delay relationships obtained for a radio receiver whose position is fixed and known. In one embodiment of the present invention, said step of determining the real time difference between the operating clocks of said first and second radio transmitters comprises:

causing a radio receiver, whose position is known and which is synchronised to said second radio channel, to listen on said first radio channel for said synchronisation feature and to determine the time of arrival (OTD) of the transmitted feature, where said time of arrival (OTD) represents the difference between the propagation delays over said first and second radio channels to the mobile device, offset by the real time difference (RTD) between the operating clocks of the two transmitters; and determining the actual difference (GTD) between the propagation delays over said first and second radio channels to the mobile device using the known positions of said radio receiver and the first and second radio transmitters; and determining said RTD using said OTD and said GTD.

The present invention may advantageously be used in a system arranged to determine the position of a mobile communications device and where the device is required to measure OTDs for a plurality of neighbouring base transceiver stations, relative to a serving base transceiver station. For each of the neighbouring base transceiver stations, the cellular network determines a RTD and transmits it to the mobile device. The mobile device then uses the RTDs to define time windows during which it listens to the respective radio channels. Preferably, the list of neighbouring base transceiver stations is transmitted to the mobile device from the serving base transceiver station, together with the respective RTDs.

The present invention may be used to determine a Timing Advance value for a new base transceiver station (TAN) to which a mobile device is to be "handed over". This can be done prior to handover, using the Timing Advance value previously determined for the current, serving base transceiver station (TAS), the real time difference (RTD) for the new base transceiver station relative to the serving base transceiver station, and the observed time difference (OTD) measured for the new base transceiver station, i.e. TAN=2 (OTD−RTD)+TAS.

Preferably, said synchronisation features are synchronisation sequences which are transmitted by a base transceiver station at regular intervals over a broadcast radio channel.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 2:
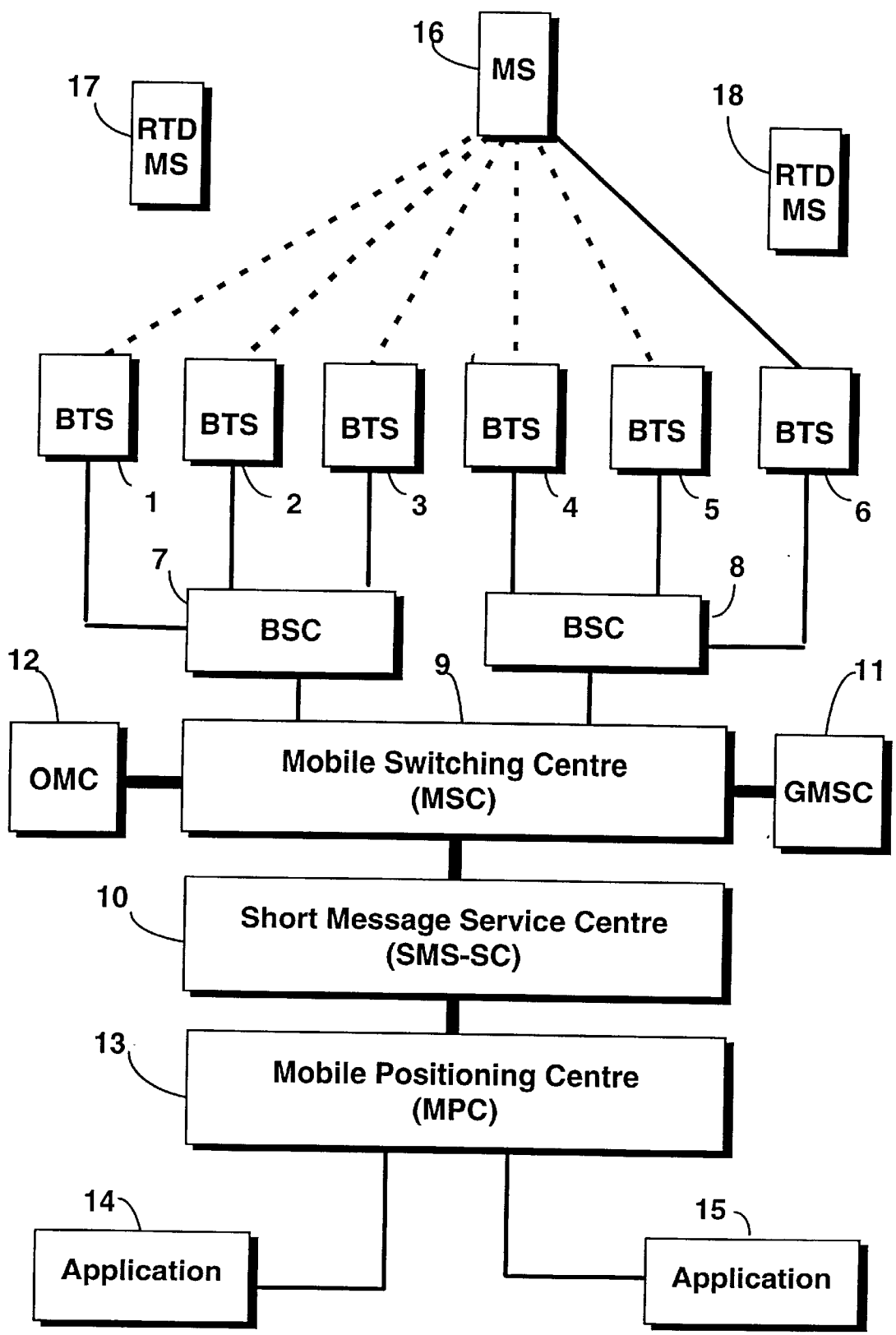
FIG. 2 illustrates a GSM system modified to carry out the Observed Time Difference method of FIG. 1.

A GSM network embodying the present invention is shown in FIG. 2. The network has inter alia Base Transceiver Stations (BTS) 1 to 6, Base Station Controllers (BSC) 7,8 (each BSC controlling a subset of BTSs), a Mobile Switching Centre (MSC) 9 linked to the two BSCs 7,8, and a Short Message Service-Service Centre (SMS-SC) 10.

The network uses a Home Location Register (HLR) and a Visitor Location Register (VLR), not shown in FIG. 2, to maintain the status and Location Area (LA) of a MS, or the address of a foreign network if the MS is not registered to its home network. The MSC 9 of the network communicates with additional networks, including a Public Switched Telephone Network (PSTN), through a Gateway MSC (GMSC) 11, and with an Operation and Maintenance Centre (OMC) 12. The OMC 12 maintains and updates information in the network. A Mobile Positioning Centre (MPC) 13 is added to the conventional GSM network architecture and is used by location applications 14, 15 which are also additional to the conventional GSM network architecture.

FIG. 2 shows a MS 16 which, for the purposes of this explanation, is assumed to be able to receive transmissions from each of BTSs 1 to 6. At any given time, the MS is registered to only one BTS (BTS 6 in FIG. 2) which is termed the "serving" BTS. User data and signalling data are communicated between the network and the MS 16 via this serving BTS 6. However, the MS 16 also continuously monitors the level of signals received from the other surrounding BTSs 1 to 5 for the purpose of facilitating a handover, e.g. when the MS 16 crosses from the serving area of one BTS to that of another BTS. These surrounding BTSs 1 to 5 are identified to the MS 16 by the controlling BSC 8, via the serving BTS 6, when the MS 16 is actively communicating with the network. The MS 16 reports the measured signal levels, over a Slow Associated Control Channel (SACH), to the BSC 8 via the BTS 6. From the received signal levels, the BSC 8 can determine whether the MS 16 should be handed over to another BTS 1 to 5 and/or whether a new "handover" list of BTSs, for monitoring by the MS 16, should be transmitted to the MS 16.

The GSM system is a Time Division Multiple Access (TDMA) based system in which data is transmitted between the network and MSs in time slots allocated to MSs. A TDMA frame is divided into eight time slots. A consequence of this method is that the MS 16 must be synchronised with the serving BTS 6 in order to ensure that data transmitted from the MS 16 is received at the BTS 6 in the time slot allocated to the MS 16, and that signals received by the MS 16 are sampled at the correct points in time. Data sent from the BTS 6 to the MS 16 contains synchronisation sequences which are known to the MS 16 and which allow the MS 16 to "lock-on" to the BTS 6 transmissions. The internal clock of the MS 16 is thus synchronised with that of the serving BTS 6, but including an offset corresponding to the propagation delay time between the serving BTS 6 and the MS 16. The propagation time delay between the MS 16 and the BTS 6 is computed (at regular time intervals) and sent from the BTS 6 to the MS 16 as a Timing Advance (TA) value to allow the MS 16 to compensate for the propagation delay in its transmissions.

Assume that one of the network applications 14,15 requests that the position of the MS 16 be determined. This request may be initiated by the MS 16 itself, by the network, or by a remote subscriber or connection, and is passed to the MPC 13. For each BTS, the MPC 13 holds a "locating" list of other neighbouring BTSs suitable for determining the position of a MS served by that BTS. This information has been provided to the MPC 13 by the OMC 12. Upon receipt of the position determining request, the MPC 13 enquires from the registers (HLR and VLR) in the MSC 9 the status of the MS 16 and, if the MS 16 is active, the serving BTS. If the MS is not currently active, but is reported as switched on, then the MSC 9 will page the BTSs in the LA to determine the serving BTS. The MPC 13 selects the set of neighbouring BTSs corresponding to the serving BTS and this set or list is transmitted to the MS 16 via the serving BTS 6. The selected location list may identify a minimum of two BTSs. These may be ones of the BTSs already identified in the handover list, i.e. BTSs 1 to 5, or the location list may include other BTSs. It will be appreciated that BTSs suitable for use in position determination can be relatively remote from the MS 16 as only a unidirectional radio link, from the BTS to the MS 16, is required. The important point is that the identified BTSs have an optimal, or near optimal, geometry for position determination.

Figure 3:
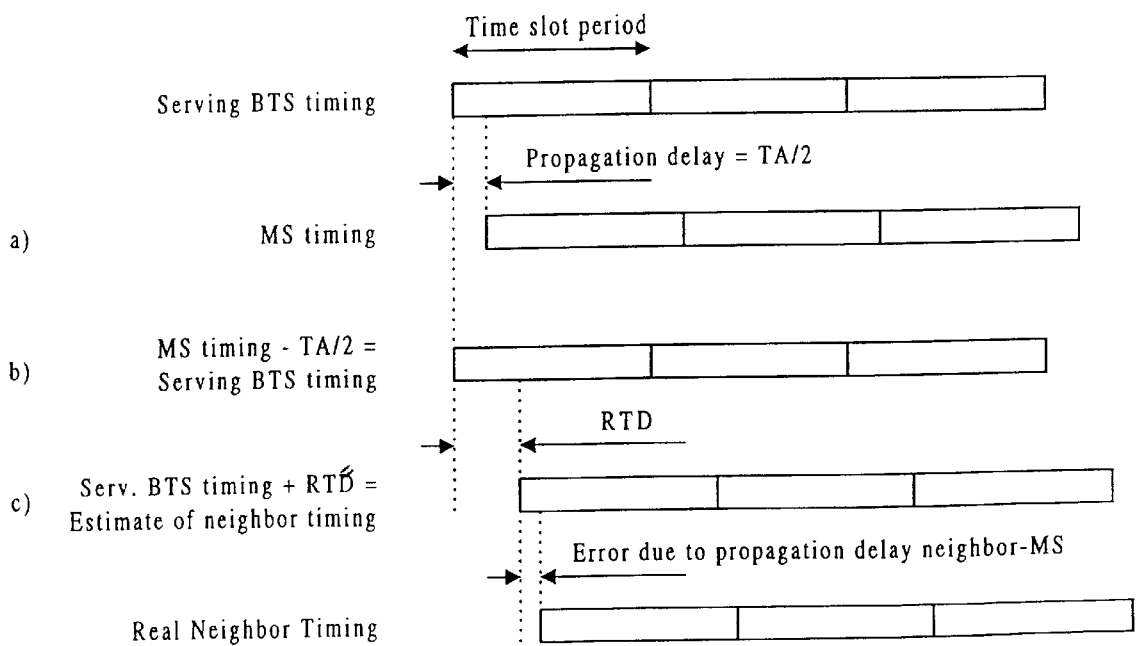
FIG. 3 illustrates various timings in the system of FIG. 2.

Together with the list of neighbouring BTSs, the serving BTS 6 sends to the MS 16 a corresponding list of Real Time Differences (RTDs) which represent the timing offsets between the various listed BTSs and the serving BTS. The derivation of these RTDs will be explained below. When the MS 16 knows an RTD for a neighbouring BTS it can, based on its own timing, estimate when the next (and successive) synchronisation sequence from that neighbouring BTS is going to arrive. This procedure is set out as follows, with reference to FIG. 3:

(1) The MS synchronises itself to the reception time of synchronisation sequences from the serving BTS in the conventional way (a).

(2) The serving BTS sends the Timing Advance (TA) value for the serving BTS to the MS, again in the conventional manner way.

(3) The serving BTS then sends to the MS the RTD values between itself and the neighbouring BTSs listed in the location list.

(4) The MS subtracts half of the TA value from its own timing to obtain the timing of the serving BTS (b).

(5) The MS adds (or subtracts, depending upon how the RTD is defined) each RTD value to the timing of the serving BTS to estimate the timing of the respective neighbouring BTS (including the error of the unknown propagation delay between the MS and the neighbouring BTSs) (c).

As indicated above, the estimate of the arrival time of a synchronisation sequence from a neighbouring BTS does not account for the propagation delay between that BTS and the MS. In a GSM network, the radius of a typical cell is of the order of a few kilometres, giving a typical propagation delay of the order of 0.01 mSec. Given that the separation between successive synchronisation sequences is typically around 0.577 mSec (i.e. one sequence per slot, with a TDMA frame divided into 8 slots), even if the measurement window is extended by 0.1 mSec on either side of the expected duration of the synchronisation sequence, the window remains short relative to the synchronisation sequence separation time. This reduces power consumption, increases the probability of successful reception, and saves computing capacity in the mobile. When a synchronisation sequence arrives as expected, this also confirms the identity of the transmitting BTS. However, if the synchronisation sequence arrives in totally different time window than expected, this indicates to the MS 16 an error has occurred.

Figure 1:
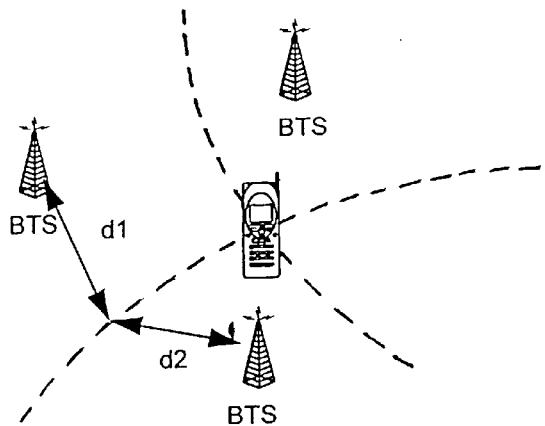
FIG. 1 illustrates an Observed Time Difference method of obtaining the position of a MS.

Assuming that synchronisation sequences are transmitted by the serving BTS 6 and one of the listed BTSs at the same time, then the difference in the time of arrival of the sequence at the MS 16 (the Observed Time Difference OTD) would correspond to the difference in the propagation delays between the MS 6 and the two BTSs. This would allow the position of the MS 6 to be placed on a hyperbola as shown in FIG. 1, in the absence of the Real Time Differences (RTD) which exist between the serving BTS 6 and each listed BTS. The actual propagation delay difference (the Geometric Time Difference GTD) is therefore given by GTD=OTD−RTD.

In order to determine the RTD between the serving BTS 6 and one of the listed BTSs (for use in obtaining a GTD and to define the measurement window described above), use is made of a radio terminal whose position is fixed and known to the network. FIG. 2 illustrates two such terminals 17,18. As the position of the terminal is known, the GTD for any two BTSs is also known. By obtaining an OTD measurement for a pair of BTSs, the RTD value for that pair can be derived. When an OTD measurement is obtained for the MS 6, whose position is unknown and to be determined, the corresponding GTD can be obtained using the measured OTD and the calculated RTD. A list of neighbouring BTSs for which RTDs are required is sent from the serving BTS to the RTD MSs 17,18. For a more detailed description of this computation, the reader is referred to EP0767594.

As has already been mentioned, FIG. 2 shows a system resource 10 termed the Short Message Service-Service Centre SMS-SC. A SMS is a 160 character, text only message format which operates separately from the voice service of the GSM cellular radio network and is specified by an ETSI GSM recommendation. The recommendation describes the connection of the Service Centre to a Mobile Switching Centre (MSC), such as the MSC 9 in FIG. 2, and also describes the operation of the Service Centre (SC) in connection with sending and relaying SMS messages. This existing service may advantageously be used to relay the list of neighbouring BTSs and respective RTDs, to be used in the position determination, from the network to the MS 16. The SMS service may also be used to relay OTDs from the MS 16 to the MPC 13 where the values are used to compute the position of the MS 16.

As an alternative to the use of SMS for sending position data between the serving BTS 6 and the MS 16, data may be transmitted for example on a packet data channel (e.g. in a General Packet Radio Service GPRS) or using an Unstructured Supplementary Data service (USSD).

In an alternative embodiment of the present invention, computed RTDs are used to aid handover (or so-called "pseudo-synchronous" handover) from one BTS to another. Assume that the serving BTS has informed the MS about the RTD value between the serving BTS and a new neighbouring BTS. The MS measures the Observed Time Difference (OTD) between the synchronisation sequences transmitted from the two BTSs. The equation between OTD and RTD is $$OTD = RTD + GTD, \qquad (1)$$

where the Geometric Time Difference (GTD) is the difference due to the geometry i.e. the difference in the propagation delays between the serving BTS and the MS (PDS) and between the neighbouring BTS and the MS (PDN).

$$GTD = PDN - PDS = (TAN - TAS)/2, \qquad (2)$$

since TA is twice the propagation delay. Here TAN is the TA value of the neighbouring (new serving) BTS and TAS is the TA value of the (old) serving BTS. Using Equations (1) & (2) we obtain $$TAN = 2(OTD - RTD) + TAS \qquad (3)$$

Thus the MS can determine the new TA value (TAN) to be used for the new BTS before the actual handover occurs.

It will be appreciated that whilst the present invention has been illustrated above with reference to the GSM cellular radio telephone standard, the invention is applicable to other cellular telephone standards such as the US CDMA standards and the Japanese PCN standard.

What is claimed is:

1. A method of determining the position of a mobile communications device in a cellular telephone network and comprising the steps of:

synchronising the mobile communications device to each of a plurality of neighboring base transceiver stations using the method comprising, in a Time Division Multiple Access (TDMA) cellular radio telephone system, synchronising a mobile communications device to a first radio channel transmitted from a first radio transmitter when the mobile communications device is currently synchronised to a second radio channel transmitted from a second radio transmitter, and wherein said first radio channel conveys at least one synchronization feature, the method further comprising:
determining a real time difference between the operating clocks of said first and second radio transmitters;
transmitting said determined real time difference, or a value or values derived therefrom, from said second transmitter to the mobile communications device, over said second radio channel;
causing the mobile communications device to listen to said first radio channel for said synchronisation feature during a time window or windows derived from said determined real time difference or said value or values derived therefrom; and wherein said second transmitter belongs to a serving base transceiver station, and determining respective Observed Time Differences (OTDs); and determining the position of the mobile device using said OTDs and the respective RTDs.

2. A method according to claim 1, wherein said real time difference is determined using time delay relationships obtained for a radio receiver whose position is fixed and known.

3. A method according to claim 2, wherein said step of determining the real time difference between the operating clocks of said first and second radio transmitters comprises:

causing the radio receiver, whose position is known and which is syhchronised to said second radio channel, to listen on said first radio channel for said synchronisation feature and to determine the time of arrival (OTD) of said synchronisation feature, where said time of arrival (OTD) represents the difference between the propagation delays over said first and second radio channels to the mobile device, offset by the real time difference (RTD) between the operating clocks of the two transmitters; and determining an actual difference (GTD) between the propagation delays over said first and second radio channels to the mobile device using the known positions of said radio receiver and the first and second radio transmitters; and determining said RTD using said OTD and said GTD.

4. A cellular radio telephone network for use in the method of claim 1, the network comprising:

said first and second radio transmitters associated with respective first and second base station transceiver stations; and signal processing means for determining said real time differences (RTD);

wherein said second transmitter is arranged to receive said determined real time difference, or said value or values derived therefrom, from said single processing means and to transmit this to a mobile communications device.

5. In a cellular radio telephone system, a method of determining a timing for a neighbouring base transceiver station for the purpose of determining the position of a mobile communications device in a cellular telephone network, the method comprising:

synchronising the mobile device to the neighbouring base transceiver station using the method of claim 4 to enable an Observed Time Difference (OTD) to be obtained, relative to the serving base transceiver station; and determining said timing using the real time difference (RTD) for the neighbouring base transceiver station relative to the serving base transceiver station, and the observed time difference (OTD) measured for the neighbouring base transceiver station.

6. A mobile communications device for use in the method of claim 1 and comprising:

a radio receiver for receiving said real time difference (RTD) or said value(s); and signal processing means for defining said time window(s) using said determining real time difference, or said value or values derived therefrom and for causing said radio receiver to listen to said first radio channel for said synchronisation feature during said time window or windows.

* * * * *